United States Patent
Derocher (12) 
(10) Patent No.: US 6,822,640 B2
(45) Date of Patent: Nov. 23, 2004

(54) ILLUMINATED TOUCH PAD

(75) Inventor: Michael D Derocher, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 298 days.

(21) Appl. No.: 09/829,692

(22) Filed: Apr. 10, 2001

(65) Prior Publication Data

US 2002/0145594 A1 Oct. 10, 2002

(51) Int. Cl.⁷ .................................................. G09G 5/00
(52) U.S. Cl. ..................................... 345/173; 178/18.11
(58) Field of Search ............................... 345/176, 173, 345/174, 183, 102; 178/18.01, 18.03, 18.05, 18.06, 18.11

(56) References Cited

U.S. PATENT DOCUMENTS

| | | | | |
|---|---|---|---|---|
| 5,132,681 A | * | 7/1992 | Yabe et al. | |
| 5,153,386 A | * | 10/1992 | Siefer et al. | ............. 178/18.11 |
| 5,359,155 A | * | 10/1994 | Helser | |
| 5,495,077 A | | 2/1996 | Miller et al. | ................... 178/18 |
| 5,560,696 A | * | 10/1996 | Orlich | |
| 5,627,347 A | | 5/1997 | Kwon | |
| 5,736,686 A | * | 4/1998 | Perret et al. | ............. 178/18.11 |
| 5,747,756 A | | 5/1998 | Boedecker | .................. 200/5 A |
| 6,061,051 A | * | 5/2000 | Chan et al. | |
| 6,118,435 A | * | 9/2000 | Fujita et al. | |
| 6,215,476 B1 | * | 4/2001 | Depew et al. | |
| 6,462,941 B1 | * | 10/2002 | Hulick et al. | |
| 6,518,958 B1 | * | 2/2003 | Miyajima et al. | |
| 6,587,097 B1 | * | 7/2003 | Aufderheide et al. | ....... 345/173 |
| 6,621,473 B2 | * | 9/2003 | Lai et al. | ..................... 345/32 |

FOREIGN PATENT DOCUMENTS

| | | |
|---|---|---|
| EP | 0 421 025 | 4/1991 |
| WO | WO 00/23873 | 4/2000 |

* cited by examiner

Primary Examiner—Regina Liang
(74) Attorney, Agent, or Firm—Jeff D. Limon (57) ABSTRACT

A device used to accept an operator input to a computing device is disclosed. The device includes a first layer that includes a translucent, two-dimensional cover. Additionally included is a second layer in which a plurality of surfaces is constructed using a translucent and conductive material. The device further includes a third layer that employs a light-emitting material that generates light in response to the operator input.

27 Claims, 8 Drawing Sheets

ILLUMINATED TOUCH PAD

BACKGROUND OF THE INVENTION

The invention pertains generally to the field of computing devices and, more particularly, to input devices used with computing devices.

In a computing device, such as a hand-held computer, laptop computer, or similar computing resource, a touch pad is often used as a graphical input device that conveys user inputs which control the operations of the computing device. Typically, the touch pad makes use of a two-dimensional array of capacitive or resistive surfaces that determine the position of a user's finger on the surface of the touch pad. These inputs are directed to a keyboard controller or to a main central processing unit. The inputs enable aspects of the computing device to be controlled by way of the touch pad located on the computing device, thus providing a control means other than an external graphical pointing device, such as a mouse or trackball.

It is often the case that a computing device user makes use of a touch pad to control the movement of a cursor as well as to control other aspects of the display, such as scroll bars, zooming, and so forth. When this occurs, the user can become confused as to the operating mode of the touch pad at a given time. A partial solution has been offered in which an indicator is used to identify whether the touch pad is controlling the cursor, horizontal or vertical scroll bars, or similar display functions. However, the placement of the indicator may not enable the user to intuitively determine the mode of operation of the touch pad.

Therefore, what is needed, is a touch pad that presents feedback that is responsive to user inputs. This can provide a more intuitive method and system of indicating to a user whether or not the touch pad has been activated for use for cursor control, or to control other aspects of the computing device's display.

SUMMARY OF THE INVENTION

The invention is pointed out with particularity in the appended claims. However, important aspects of the invention are summarized herein.

In one aspect of the invention, a touch pad responds to an operator input to a computing device. The device comprises a first layer that includes a translucent surface. Also included is a second layer that makes use of a plurality of surfaces that are constructed using a translucent and conductive material. The device further includes a third layer that incorporates a light-emitting material that generates light in response to the operator input.

BRIEF DESCRIPTION OF THE DRAWINGS

A more complete understanding of the various aspects of the claimed invention can be acquired by reading this specification, in conjunction with the figures, in which like reference numerals refer to like elements, and:

DESCRIPTION OF THE PREFERRED EMBODIMENTS

A lighted touch pad provides a method and apparatus for indicating the operating state of the touch pad. The lighted touch pad can be used in conjunction with conventional capacitive or resistive sensor arrays that report the position of a user's finger or thumb on the surface of the touch pad. Aside from providing illumination of the entire touch pad surface by way of a single light-emitting layer, multiple layers can provide additional colors, graphics, and illumination of sections that indicate specific modes of operation.

Figure 1:
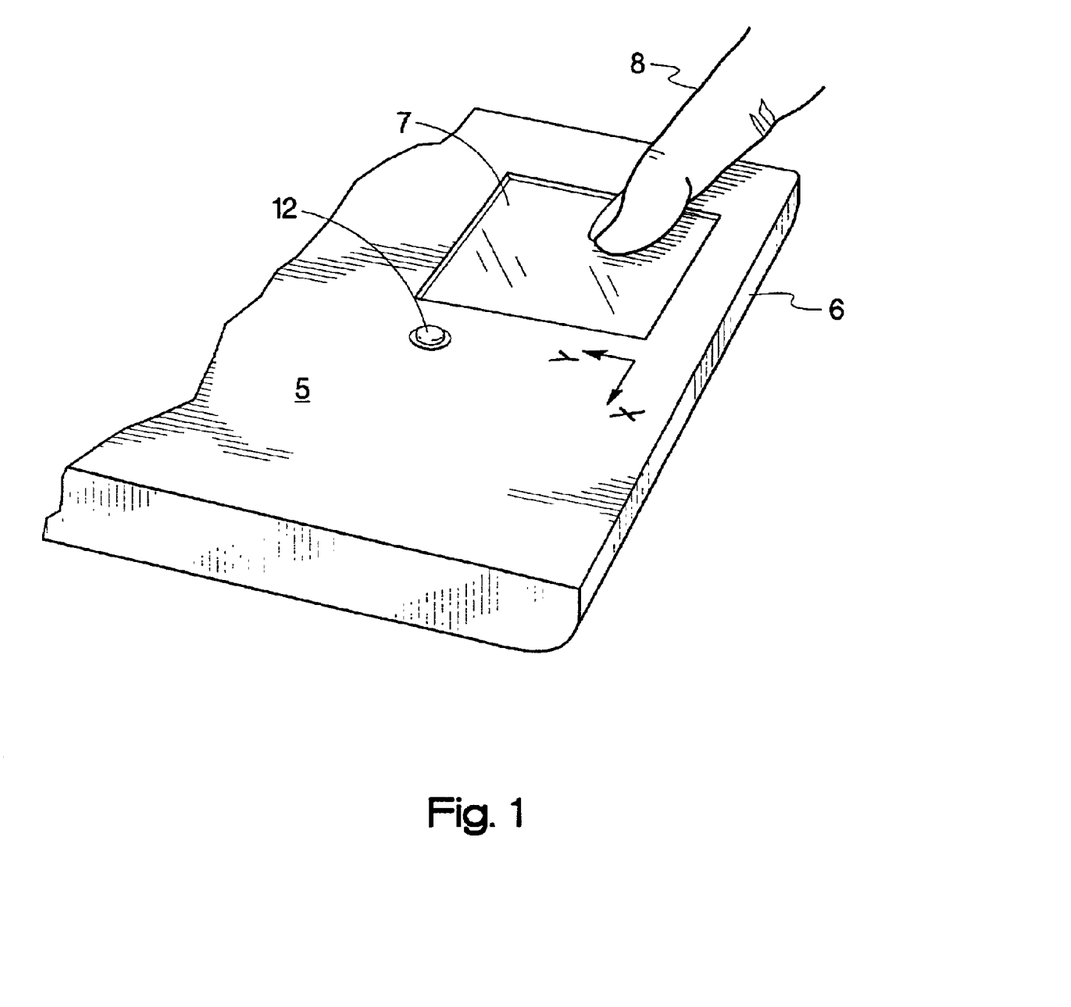
FIG. 1 is an illustration of a touch pad used in a computing device in accordance with a preferred embodiment of the invention.

FIG. 1 is an illustration of a touch pad used in a computing device in accordance with a preferred embodiment of the invention. In FIG. 1, computing device 5 represents a hand-held computing device, laptop computer, or similar computing resource. Computing device 5 includes touch pad 7, which enables a user's finger (8) to control operations of the computing device. As an example, which is not intended to limit the invention, touch pad 7 is a smooth, two-dimensional surface used to position graphical icon, such as a cursor or an arrow, within an area of a display unit controlled by computing device 5. Thus, as user's finger 8 is moved in "x" and "y" directions as shown in FIG. 1, a cursor or other graphical icon moves correspondingly about the associated computer display. Additionally, switch 12, located adjacent to touch pad 7, is representative of a selector that activates or deactivates touch pad 7. Although the exemplary embodiment of FIG. 1 shows touch pad 7 being predominantly two-dimensional, nothing prevents the use of a touch pad that is curved, domed, or rounded, thus including a third dimension.

Figure 2:
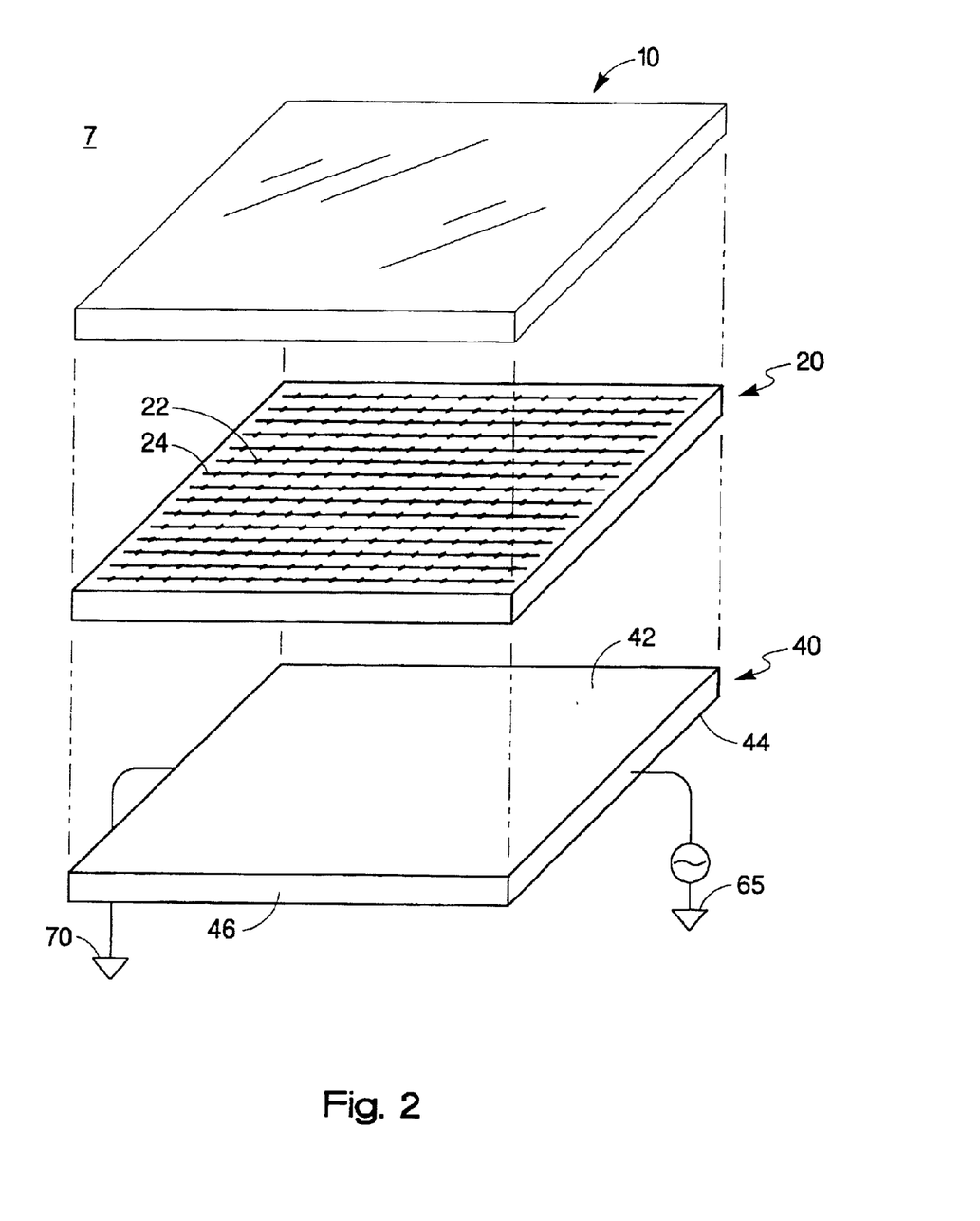
FIG. 2 is a view showing the layers of the touch pad of FIG. 1 in accordance with a preferred embodiment of the invention.

FIG. 2 is a view showing the layers of the touch pad of FIG. 1 in accordance with a preferred embodiment of the invention. In FIG. 2, the layers of touch pad 7 have been separated in order to identify their functions. Cover 10 represents an environmental seal that protects touch sensor 20 and a light-emitting layer 40 from external environmental effects. Cover 10 can be constructed of any suitable translucent material that can be applied over a two-dimensional surface such as touch pad 7. It is also desirable that the material used for cover 10 is isotropic and possesses desirable electrical properties such as low relative permittivity and low electrical conductivity. These properties ensure that any electric fields that emanate from touch sensor 20 (described below) are not affected by the presence of cover 10.

Beneath cover 10 lies touch sensor 20, which incorporates capacitive or resistive surfaces used to identify the location of a user's finger, such as user's finger 8, above cover 10. In one example, touch sensor 20 includes capacitive surfaces 22, which are coupled in the "x" axis by way of "x" axis inputs 24. Also in accordance with conventional design techniques, the underside of touch sensor 20 (not shown) includes similar capacitive surfaces, as well as "y" axis inputs. Preferably, capacitive surfaces 22 and "x" axis inputs 24, as well as the similar capacitive surfaces and "y" axis inputs present on the reverse side of touch sensor 20 (not shown) are fabricated by way of a conductive ink applied to a flexible and translucent substrate. Further, it is most desirable that all capacitive surfaces, as well as "x" and "y" axis inputs are fabricated using a transparent conductor, such as Indium Tin Oxide.

In another example, not shown in FIG. 2, a resistive sensor array is used to sense the position of a user's finger or thumb that applies pressure to the surface of cover 10. In this example, an array of resistive surfaces determines the location of the user's finger or thumb by measuring the resistance through individual and adjacent resistive elements of a resistor array. For this example, it is also desirable that the conductors used to implement the resistor array as well as the required conductors be of a transparent material, such as Indium Tin Oxide.

Beneath touch sensor 20 lays light-emitting layer 40, which provides illumination of touch sensor 20 as well as cover 10 from the underside of the touch sensor. Thus, at least a portion of the light generated by light-emitting layer 40 is visible to a user from above the surface of cover 10. In an example, which is not intended to limit the principles of the invention, light-emitting layer 40 operates by way of electroluminescence. In this example, alternating current source 65 applies a voltage to conductive layer 44. This alternating current voltage excites light-emitting material 46, thereby causing the material to radiate light of a predetermined wavelength. Conductive layer 42, above light-emitting material 46, is interfaced to a signal ground by way of ground 70.

Figure 3:
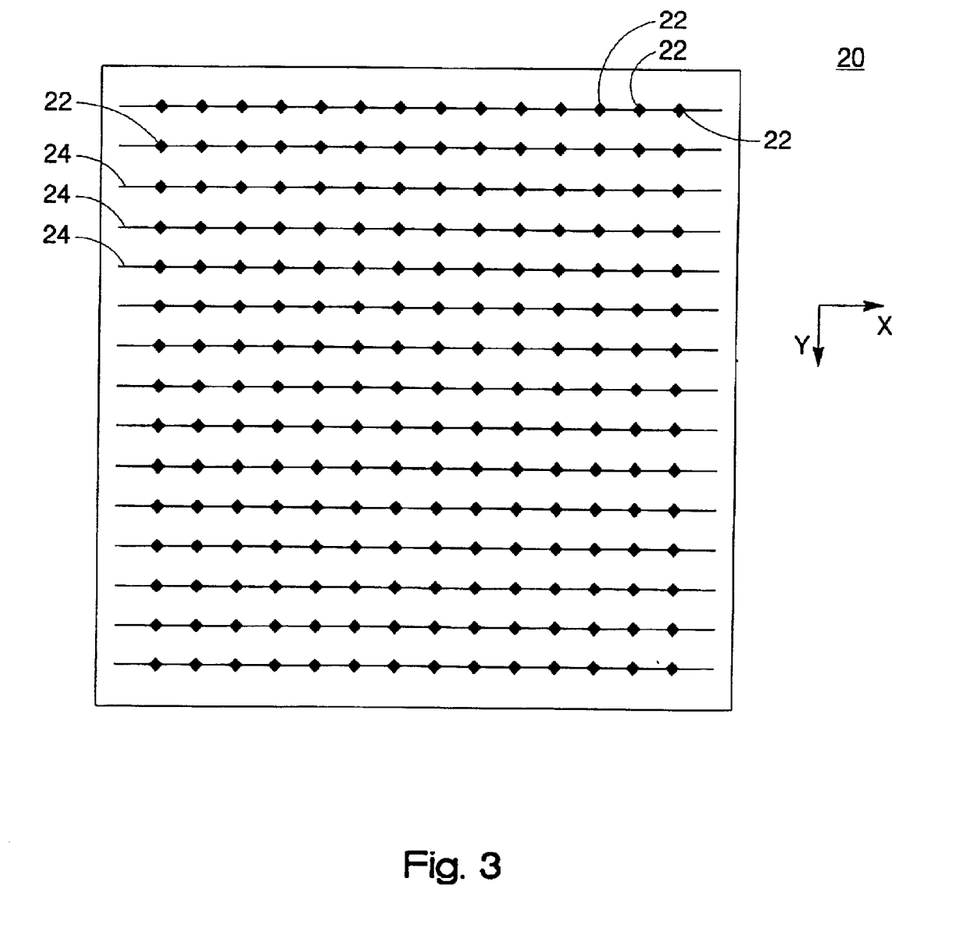
FIG. 3 is a view of the capacitive surfaces shown in FIG. 2 in accordance with a preferred embodiment of the invention.

FIG. 3 is a view of the capacitive surfaces (22) shown in FIG. 2 in accordance with a preferred embodiment of the invention. In FIG. 3, capacitive surfaces 22 are joined to each other by way of "x" axis inputs 24. Although capacitive surfaces 22 are shown in FIG. 3 as being diamond shaped, nothing prevents the use of other shapes, such as circles or rectangles, to optimize the self-capacitance of each of capacitive surfaces 22, as well as the mutual capacitances that exist between an element of capacitive surfaces 22 and the others of capacitive surfaces 22. As previously mentioned, it is anticipated that capacitive surfaces 22 as well as "x" axis inputs 24 are applied by way of conductive ink screened onto a flexible and translucent substrate. However, it is most desirable that all conductive constituents of the touch sensor of FIG. 3 are fabricated using a transparent conductor, such as Indium Tin Oxide.

Figure 4:
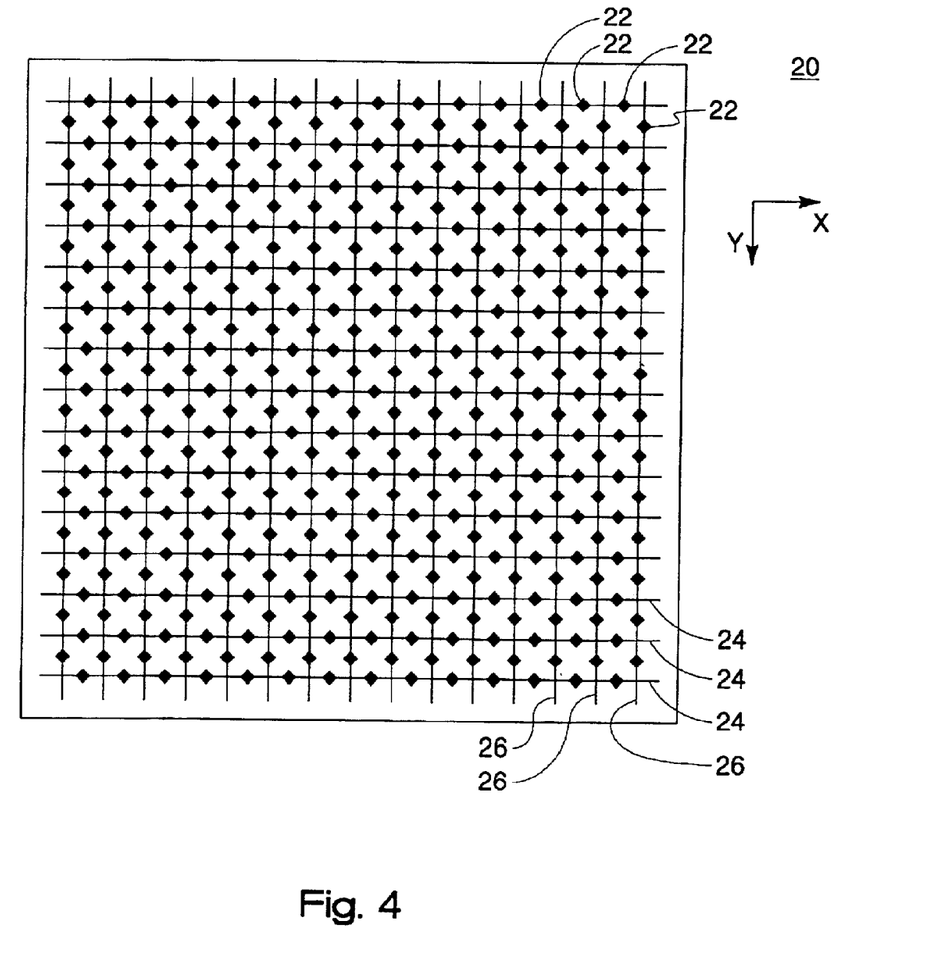
FIG. 4 is a composite view showing the capacitive surfaces on both the top and the bottom of the second layer of FIG. 2 in accordance with a preferred embodiment of the invention.

FIG. 4 is a composite view showing the capacitive surfaces on both the top and the bottom of touch sensor 20 of FIG. 2 in accordance with a preferred embodiment of the invention. In FIG. 4, the substrate onto which capacitive surfaces 22, "x" axis inputs 24, as well as "y" axis inputs 26 are mounted is shown as being transparent, which allows capacitive surfaces 22, present on both the front side and reverse side of second layer 20, to be visible. Although a transparent substrate material has been assumed, nothing prevents the use of a substrate that is merely translucent, thereby permitting some distortion of light passing from the reverse to the front side of the substrate.

Figure 5:
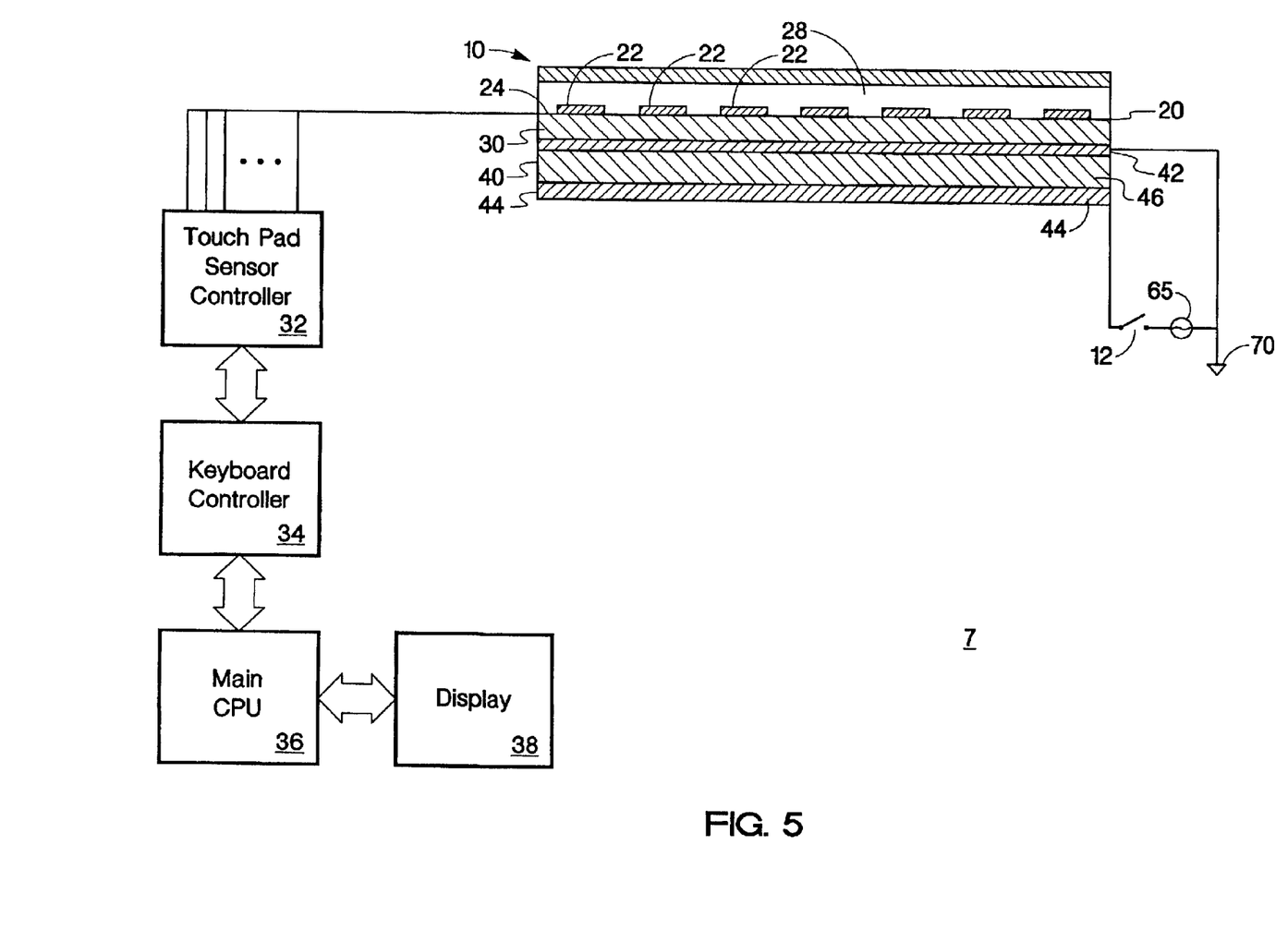
FIG. 5 is a block diagram of the touch pad and associated electronics in accordance with a preferred embodiment of the invention.

FIG. 5 is a block diagram of the touch pad and associated electronics in accordance with a preferred embodiment of the invention. In FIG. 5, an end view of touch pad 7 shows cover 10, touch sensor 20, light-emitting layer 40, as well as intervening layers. Cover 10 is shown as being located above touch sensor 20. Capacitive surfaces 22 are shown as being interfaced to each other along the "x" axis by way of "x" axis inputs 24. Although touch pad 7 of FIG. 5 identifies only "x" axis inputs, an end view from another aspect could have been used without jeopardizing the creative principles of the invention. Thus, "x" axis inputs can be replaced by "y" axis inputs in FIG. 5. In any case, each of capacitive surfaces 22 is substantially electrically isolated from each other, and from conductive layers 42 and 44 by way of insulating materials 28 and 30, which are positioned above and below, respectively, the capacitive surfaces.

In accordance with conventional techniques, the plurality of "x" axis inputs 24 is shown as being interfaced with touch pad sensor controller 32. Preferably, touch pad sensor controller 32 ascertains the location on touch pad 7 of a user's finger, such as user's finger 8 of FIG. 1, by combining the "x" axis inputs 24 and "y" axis inputs 26. The output of touch pad sensor controller 32 is conveyed to keyboard controller 34, which conveys the location of the cursor or other graphical indicator to main CPU 36. In turn, main CPU 36 places the cursor or other graphical icon at a corresponding location on display 38.

Although shown in FIG. 5 as including wire line signal paths between touch pad sensor controller 32, keyboard controller 34, main CPU 36, and display 38, nothing prevents the use of wireless links between these elements of touch pad 7. These links can be implemented by way of Bluetooth or other, similarly capable, wireless technology.

Touch pad sensor controller 32 preferably possesses an additional capability to operate the touch pad to control either a vertically-oriented scroll bar to control a horizontally-oriented scroll bar that permits panning or moving the field of the display within a larger field-of-view. Further, touch pad sensor controller 32 can also be used to operate the touch pad to control the magnification (i.e. zoom) of the area of a document, picture, or other file being displayed on display 38. Control of these additional functions can be activated by way of a user-controlled switch or other input to touch pad sensor controller 32, in accordance with conventional techniques. Further, touch pad sensor controller 32 operating in concert with main CPU 36 can also be used to launch a software application that runs on CPU 36. Thus, touch pad sensor controller 32 can operate as a general-purpose input device capable of controlling operating modes of the associated computing device as well as controlling aspects of cursors and other graphical icons on display 38.

As mentioned in relation to FIG. 2, light-emitting layer 40 of FIG. 5 is embodied by way of an electroluminescent layer excited by way of alternating current source 65. Control over the coupling of the alternating current from source 65 is provided by way of switch 12, which is desirably located on the surface of computing device 5. Preferably, conductive layers 42, as well as capacitive surfaces 22 and "x" axis inputs 24 are constructed of a transparent material. The use of a transparent material (Indium Tin Oxide for example) enables light generated by way of light-emitting layer 40 to be visible from a location above cover 10.

The color of light generated by light-emitting layer 40 is preferably controlled by way of a dye or metal oxide present within light-emitting material 46. Alternatively, a light-emitting material that emits light in a narrow range of color, such as green, blue, or yellow, can be blended to produce an effective white light. Additionally, a dye of a particular color can be added to light-emitting material 46 in order to produce a different color. For example in the event that light-emitting material 46 emits a blue light, adding a red dye would cause light-emitting layer 40 to produce light of a magenta color.

In an alternate embodiment, light-emitting layer 40 is replaced by an organic light-emitting diode (OLED) that employs small molecule, polymer, or other type of amorphous organic material in place of light-emitting material 46. For the case of a small molecule OLED, an organic material in a powder form is sublimated in a vacuum to from the diode. For the case of the polymer material OLED, the organic polymer is spun onto a surface to form the diode. For these embodiments, alternating current source 65 is replaced by a direct current source preferably in the range of 2 to 8 volts but could be as high as 16 volts.

In another alternate embodiment, touch sensor 20 can be replaced by any translucent or transparent means for determining the position of a user's finger or thumb near the topside of the touch sensor 20. Additionally, light-emitting layer 40 can be replaced by any means for illuminating the means for determining the position of a user's finger. Further, additional light-emitting layers can be used to generate additional colors that illuminate a graphical pointing device, such as touch pad 7, from the bottom of the pointing device.

Figure 6:
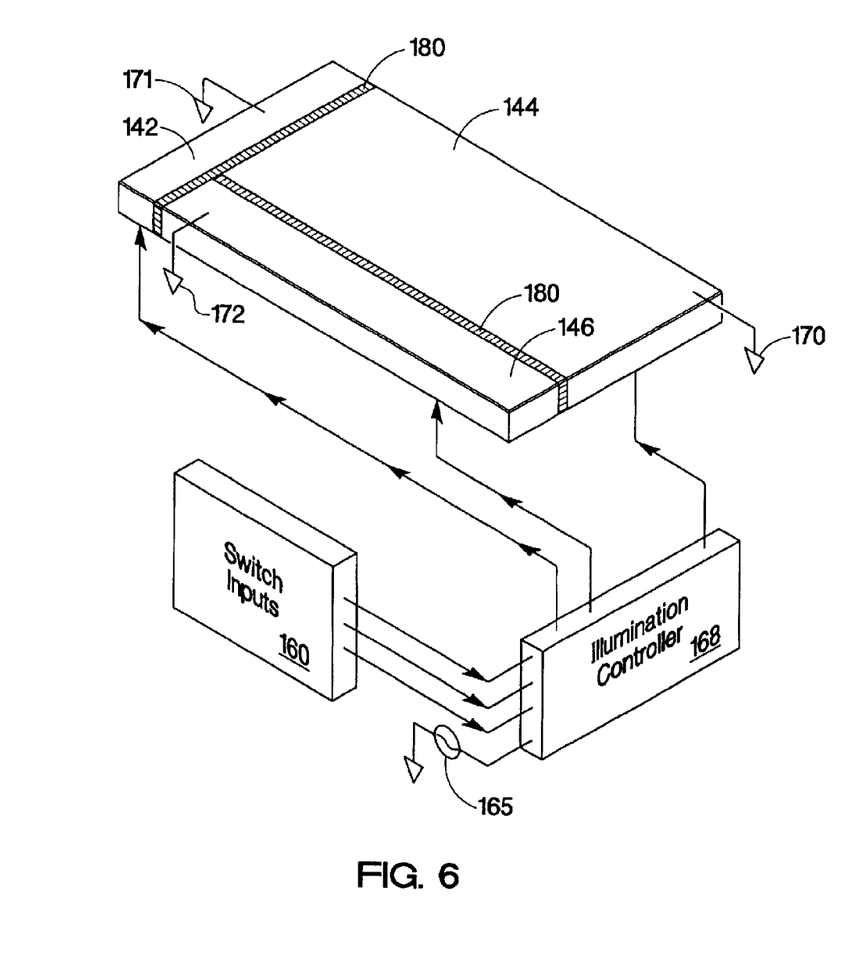
FIG. 6 is an isometric view of an additional light-emitting layer that can be positioned beneath the light-emitting layer (40) of FIG. 2 in accordance with a preferred embodiment of the invention.

FIG. 6 is an isometric view of an additional light-emitting layer that can be positioned beneath light-emitting layer 40 of FIG. 2 in accordance with a preferred embodiment of the invention. In FIG. 6, insulating material 180, which can be also be a dielectric material such as barium titanate, has been applied to the additional light-emitting layer in order to provide three separate illumination zones. Preferably, each illumination zone is controlled by way of a separate output from illumination controller 168. Further, signal grounds 170, 171, and 172 provide the necessary relative ground for each alternating or direct current signal applied to the three illumination zones by way of light-emitting controller 168. In a preferred embodiment, switch inputs 160 and illumination controller 168 are used to control the excitation of each of the three zones shown in FIG. 6.

The arrangement of FIG. 6 allows independent control over light generated from each of the three illumination zones shown in the figure. For example, one of switch inputs 160 can be used to generate light visible through illumination zone 146, thus providing light to a small portion of touch pad 7. By way of proper orientation of the additional light-emitting layer of FIG. 6 within touch pad 7, one of switch inputs 160 can be used to illuminate a relatively small portion of the right side of the touch pad. When operated in conjunction with touch pad sensor controller 32 of FIG. 5, this illumination scheme can be used to indicate that the touch pad is being used to control a scroll bar visible on an associated computer display. Similarly, when the light-emitting layer of FIG. 6 generates light visible through illumination zone 142, this illumination scheme can be used to indicate that touch pad 7 is being used to control a horizontal scroll bar. Further the illumination of both illumination zones 142 and 146 can be used to indicate touch pad 7 is being used to move or pan the view of the display within a larger area. Finally, the illumination of illumination zones 144, 142, and 146 can be used to indicate the normal operation of the touch pad.

Figure 7:
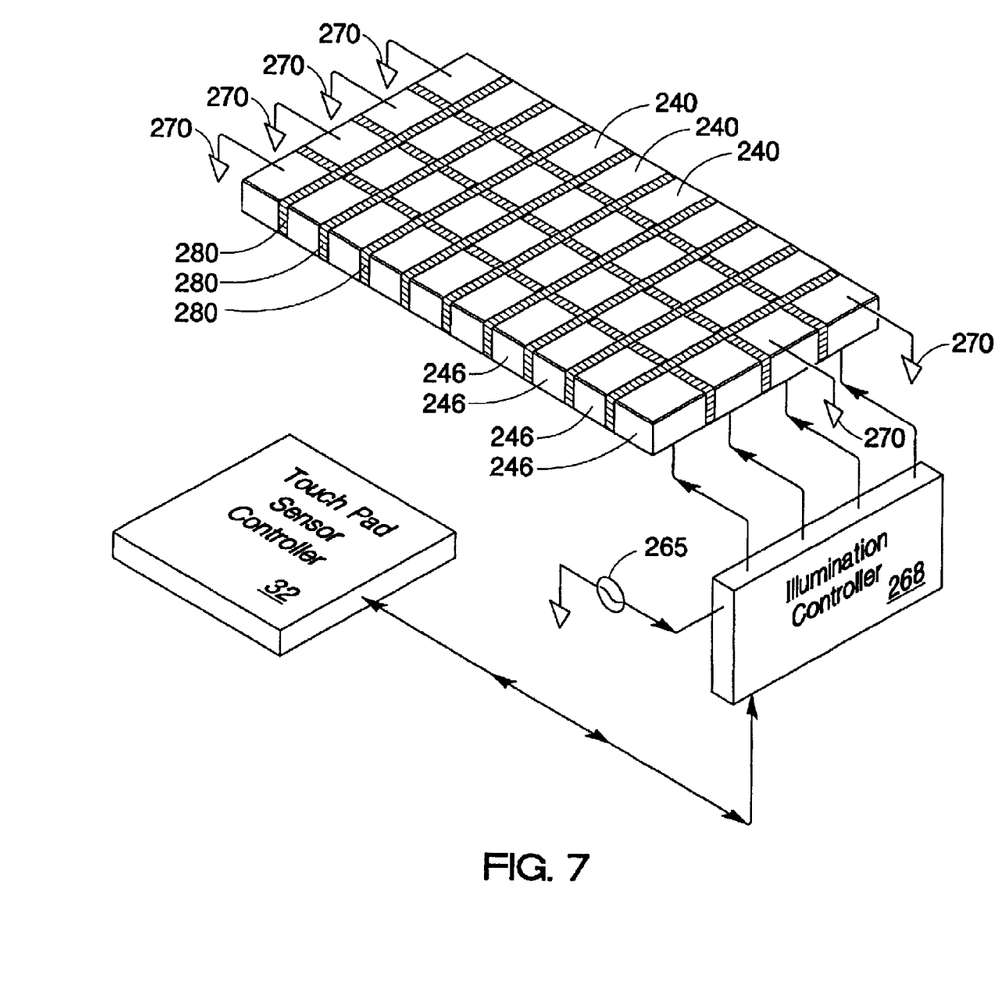
FIG. 7 is an isometric view of a light-emitting layer that provides a graphics capability constructed in accordance with a preferred embodiment of the invention.

FIG. 7 is an isometric view of a light-emitting layer that provides a graphics capability constructed in accordance with a preferred embodiment of the invention. The light-emitting layer of FIG. 7 has been partitioned to provide numerous illumination zones, each of which can be separately controlled by way of illumination controller 268. In the embodiment of FIG. 7, each illumination zone includes a light-emitting material 246 similar to light-emitting material 46 of FIGS. 2 and 5. For purposes of simplicity, illumination controller 268 is shown as being coupled to the underside of a select few of illumination zones 240, although it is preferred that the controller be coupled to each zone to permit excitation of the underside of each zone. In a similar manner, signal grounds 270 are shown as being coupled to a select few of the top sides of illumination zones 240; however, it is preferred that one of signal grounds 270 be coupled to each of the top sides of illumination zones 240.

In FIG. 7 insulating material 280 has been applied to the interstices that exist between adjacent ones of illumination zones 240. This insulating material allows the independent generation of light from each of illumination zones 240 as illumination controller 268 modulates excitation signals from voltage source 265. By way of the selective activation of certain illumination zones 240, the electroluminescence layer of FIG. 7 can be used to generate graphics with a resolution commensurate with the size and number of illumination zones 240. Further, the activation and deactivation of illumination zones 240 can be modulated in a time dependent manner to create moving graphics.

When outputs of touch pad sensor controller 32 are interfaced to illumination controller 268, information regarding the position of a user's finger (such as user's finger 8 of FIG. 1) can be conveyed to controller 268. As a result of ascertaining the location of the user's finger, the corresponding illumination zones of FIG. 7 can be selectively activated and deactivated accordingly, as shown in FIG. 8.

Figure 8:
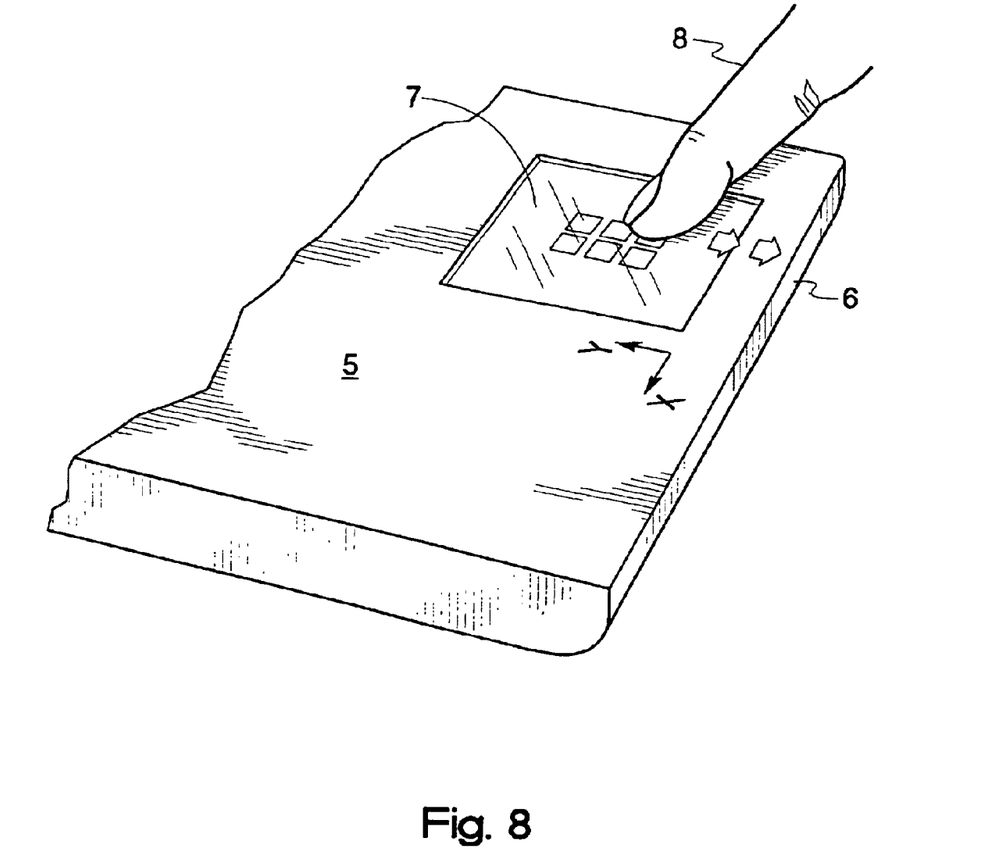
FIG. 8 shows a user's finger (8) being moved across a touch pad (7) while nearby illumination zones are activated.

FIG. 8 shows a user's finger (8) being moved across a touch pad (7) while nearby illumination zones are activated. In FIG. 8, user's finger 8 moves in the −y direction toward rear portion 6 of computing device 5. As the user's finger is moved, illumination zones, such as illumination zones 240 of FIG. 7, are shown as generating light, thus providing the user with visual feedback as to the position of his or her finger above touch pad 7. When the user selects to deactivate touch pad 7, the illumination zones no longer generate light, thus indicating to the user that the touch pad is no longer active. Desirably, the user can influence the persistence of the illuminated zones by way of interacting with a setup program that is executed by computing device 5. This allows the illumination zones to be illuminated for a variable period of time after the user's finger passes over the touch pad.

The inverse of the illumination scheme of FIG. 8 is also possible. Accordingly, when a user selects to invert the touch pad illumination scheme, the pad is generally illuminated except in the area proximate to the current location of the user's finger. Desirably, the user can influence the persistence of the illuminated zones by way of a setup page, thus allowing the zones to be extinguished for a variable period of time after the user's finger passes over the touch pad.

In an embodiment that includes an OLED to realize the function of light-emitting layer 40, illumination zones 240 can be made with much greater resolution than that shown in FIG. 7. This increase in resolution, combined with the correct persistence in the illumination of illumination zones 240, brings about the capability for a user to view a complex character entered by way of the touch pad. Thus, when touch pad 7 is used to enter an alphabetic, pictographic, or other symbolic character, a trace of the entered character can remain illuminated on the touch pad.

In another embodiment that includes the use of an OLED, a touch pad that presents the appearance and performs the functions of the user-definable or "soft" keys (F1–F12 on many standard keyboards) is used to augment or to replace these keys. Thus, applications that require input from these keys can provide the user with the opportunity to make use of the touch pad to enter this information. Further, other applications that occasionally present a window that notifies the user of a specific, required action can present this information by way of the touch pad. The touch pad can then be used to receive the required input, thus providing the user with another means of entering the required information.

It is noteworthy to mention that due to the translucent nature of the various layers used in constructing touch pad 7, further layers can be added as desired. These layers can be used to introduce additional colors beyond those previously mentioned. These layers can also allows the user to customize the display, such as selecting a red light-emitting color, to indicate that the touch pad has been inactivated, and selecting green to indicate that the touch pad is active. Additionally, each layer need not encompass the entire area of the touch pad. Thus, a particular layer can be limited to one side of the pad and become illuminated when the pad is used to control a vertical scroll bar. Another layer can be limited to the bottom of the touch pad (in the direction of rear portion 6 of the computing device of FIG. 8) in order to provide feedback when the touch pad is being used to control a horizontal scroll bar. Finally, yet another layer can be added to present a symbol, such as a trademark, logo, or other statement that conveys the identity of the manufacturer of the touch pad or of the computing device.

In conclusion, a lighted touch pad that presents feedback to user inputs provides a method and apparatus for indicating the operating state of the touch pad. The lighted touch pad can be used in conjunction with conventional capacitive or resistive sensor arrays that report the position of a user's finger or thumb on the surface of the touch pad. Aside from providing illumination of the entire touch pad surface by way of a single light-emitting layer, multiple layers can provide additional colors, graphics, and illumination of sections that indicate specific modes of operation.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It should be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A device that accepts an input to a computing device, comprising:
   a first layer having a translucent cover;
   a second layer having a plurality of surfaces, said surfaces being one of a capacitive or resistive surface and being constructed using a translucent and conductive material;
   a third layer having a light-emitting material which generates light responsive to said input, said light-emitting material generating light that persists for a period of time after one of a user's finger and thumb has been positioned at a location on the top side of said first layer, said light being generated only in an area proximate to said location; and
   a fourth layer which generates light of a different color than light generated by said third layer.

2. The device of claim 1 wherein said one of a user's finger and thumb is positioned at a location near a side of said first layer, said side being opposite said second layer, said operator input being used to control an aspect of a computer display controlled by said computing device.

3. The device of claim 2 wherein said control of said aspect of said computer display is conveyed through a wireless link between said device and said computing device.

4. The device of claim 2 wherein said control of said aspect of said computer display is conveyed through a wire line link between said device and said computing device.

5. The device of claim 2 wherein said plurality of surfaces functions by responding to changes in capacitance between adjacent ones of said plurality of surfaces.

6. The device of claim 1 wherein said input is said one of a user's finger and thumb applying pressure to said first layer, said pressure being used to control an aspect of a computer display associated with said computing device.

7. The device of claim 6 wherein said plurality of surfaces function by responding to changes in resistance between adjacent ones of said plurality of surfaces.

8. The device of claim 1 wherein said plurality of surfaces is constructed using a material which is transparent.

9. The device of claim 1 wherein said computing device launches a software application that runs on said computing device in response to said operator input.

10. The device of claim 1 wherein said light-emitting material is an electroluminescent material.

11. The device of claim 1 wherein said light-emitting material is a light-emitting diode.

12. The device of claim 1, wherein said first, second, and third layers are substantially two-dimensional.

13. The device of claim 1, wherein said operator input is a character entered on said translucent cover and said generated light forms a trace of said character.

14. A device that accepts an input to a computing device, comprising:
    a first layer having a translucent cover;
    a second layer having a plurality of surfaces, said surfaces being one of a capacitive or resistive surface and being constructed using a translucent and conductive material;
    a third layer having a light-emitting material which generates light responsive to said input, said light-emitting layer generating light that persists for a period of time after one of a user's finger and thumb has been positioned at a location on the top side of said first layer, said light being generated in areas other than an area proximate to said location; and
    a fourth layer for generating light of a different color than light generated by said third layer.

15. A device that accepts an input to a computing device, comprising:
    a first layer having a translucent cover;
    a second layer having a plurality of surfaces, said surfaces being one of a capacitive or resistive surface and being constructed using a translucent and conductive material;
    a third layer having a light-emitted material which generates light responsive to said input; and a fourth layer which generates light of a different color than light generated by said third layer, said generated light presenting the appearance of soft keys.

16. A computing device that makes use of a touch pad to provide feedback to a user, said feedback being indicative of an operating mode of at least one input device used by said computing device, comprising:

a first layer which includes a substantially rigid, transparent surface:

a second layer which includes a plurality of surfaces proximate with said first layer, said plurality of surfaces being constructed of a transparent and conductive material;

a third layer which includes a light-emitting layer, said third layer generating light in response to an operator input and notifying said user that said operator input is required, wherein said light-emitting layer is arranged to present a particular symbol to said user; and an illumination controller coupled to said third layer for bringing about said light generated in response to said operator input.

17. The computing device of claim 16 wherein said touch pad additionally receives said operator input.

18. The computing device of claim 16 wherein said operator input is a user selecting to use said touch pad to control an aspect of a display coupled to said computing device.

19. The computing device of claim 18 wherein said aspect of said display is a position of a cursor on said display.

20. The computing device of claim 18 wherein said aspect of said display is a scroll bar used in a window of said display.

21. The computing device of claim 16 wherein said plurality of surfaces functions by responding to changes in capacitance of elements of said plurality of surfaces.

22. The computing device of claim 16 wherein said operator input is conveyed by way of a wireless interface between said computing device and said touch pad.

23. The computing device of claim 16 wherein said computing device is a laptop computer.

24. The computing device of claim 16 further comprising a selector which influences an operating state of said illumination controller.

25. The computing device of claim 16 further comprising a fourth layer which generates light of a different color than said light generated by said third layer, said fourth layer generating light in response to said operator input, said fourth layer also being coupled to said illumination controller for bringing about said light generated in response to said operator input.

26. The computing device of claim 25 wherein said fourth layer covers an area of said touch pad that is substantially less than the area covered by said third layer.

27. The computing device of claim 25 further comprising a selector which activates said third and said fourth layer, thereby allowing said light generated by said third and said fourth layers to be combined to form light of a different color than said third layer and different than said fourth layer.

* * * * *